Figure 1:
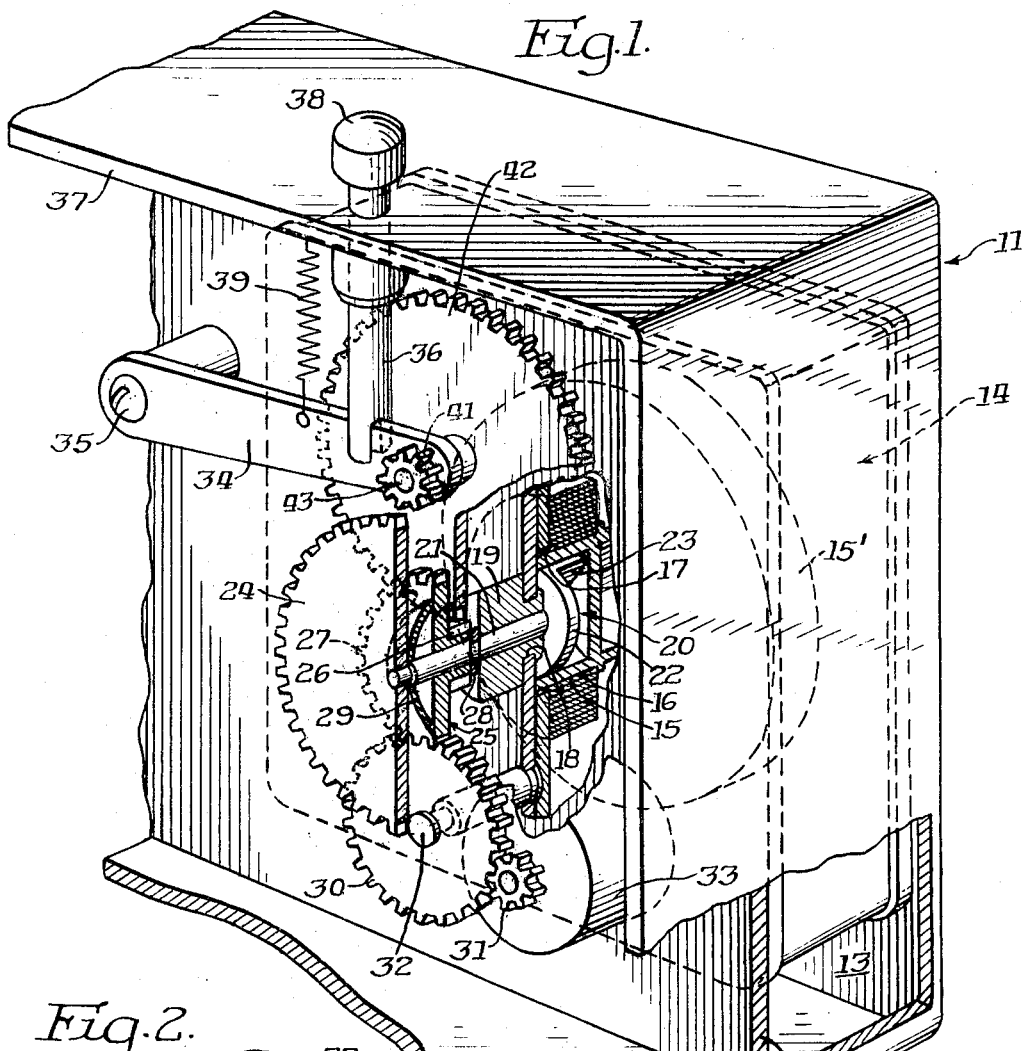

United States Patent
Koeber

[15] 3,680,813
[45] Aug. 1, 1972

[54] TWO-SPEED TAKE-UP DRIVE FOR CAMERA

[72] Inventor: Henry J. Koeber, Deerfield, Ill.

[73] Assignee: Bell & Howell Company, Chicago, Ill.

[22] Filed: July 2, 1970

[21] Appl. No.: 51,871

[52] U.S. Cl. .............................242/205, 352/91
[51] Int. Cl. ...................................G03b 1/04
[58] Field of Search.....................242/197–210; 74/194–200; 352/168, 180–182, 91, 217

[56] References Cited

UNITED STATES PATENTS

| | | | |
|---|---|---|---|
| 3,352,169 | 11/1967 | Delin et al. | 74/194 |
| 1,468,091 | 9/1923 | Thalhammer | 352/91 |
| 3,425,776 | 2/1969 | Mayr et al. | 352/91 X |

*Primary Examiner*—Leonard D. Christian
*Attorney*—William F. Pinsak, John E. Peele, Jr., Kenneth W. Greb and William K. Serp

[57] ABSTRACT

A unidirectional take-up drive mechanism of a camera of the type which accepts a film-loaded cartridge is provided with a pair of movable gears mounted on a pivoted lever whereby the gears can be moved into or out of meshing engagement with another pair of gears that drive the cartridge take-up in normal filming operation. The first pair of gears change the gear ratio of the take-up drive mechanism to slow down the rotation of the cartridge take-up so that it does not wind the film as fast as the film is fed from the cartridge supply, thereby creating an excess of loosely wound film in the cartridge. The excess film is rewound onto the supply, which film may be exposed a second time during a lap dissolve sequence.

8 Claims, 2 Drawing Figures

PATENTED AUG 1 1972

3,680,813

Inventor:
Henry J. Koeber.

By William F. Pinale
John E. Peele Jr. Attys

TWO-SPEED TAKE-UP DRIVE FOR CAMERA

This invention relates to means for making a lap dissolve with a camera having a cartridge take-up driveable in only one direction, and is particularly concerned with means for changing the gear ratio of a take-up relative to the speed at which the film is transported from the supply in the cartridge.

Lap dissolves are made by fading out one image by gradually reducing the exposure of the film and then fading in a new image on the same portion of the film by exposing it a second time and gradually increasing the exposure until the proper exposure is reached. Although this sequence of operation is a conventional photographic technique with cameras in which the take-up reel can be reversed to rewind the partially exposed film on the supply reel, it is difficult to make a lap dissolve with cameras in which the take-up can be rotated in only one direction.

The R. Bosch Elektronik & Photokino German Pat. No. 1,286,894, discloses a mechanism for making a lap dissolve with a camera of the type mentioned above, but the mechanism is complicated and cumbersome to operate. The structure of the German patent includes a manually operable blocking member to stop the take-up reel, a manually disengageable clutch, and a selectively controllable claw that controls the direction of the film travel. It is necessary to disengage the clutch and engage the blocking member to allow the once exposed film to store itself loosely in the cartridge. After the exposed film is rewound on the supply reel, it is necessary to disengage the blocking member, engage the clutch, and move the claw back to its initial position, before the normal operation of the camera can be resumed.

In the present structure, a single lever is pivoted to interpose a transmission in the gear train of the take-up drive mechanism that normally drives the camera and the take-up of the cartridge. The transmission changes the gear ratio of the take-up drive, and thereby slows the rotation of the take-up to cause an excess of partially exposed film to build up in the cartridge so that the film may be rewound and a lap dissolve can be made. The lever is shifted back to its original position when the normal operation of the camera is to be resumed.

Suitable structure by means of which the above mentioned and other advantages of the invention are attained will be fully described in the following specification, taken in conjunction with the accompanying drawings showing a preferred embodiment of the invention.

Figure 2:
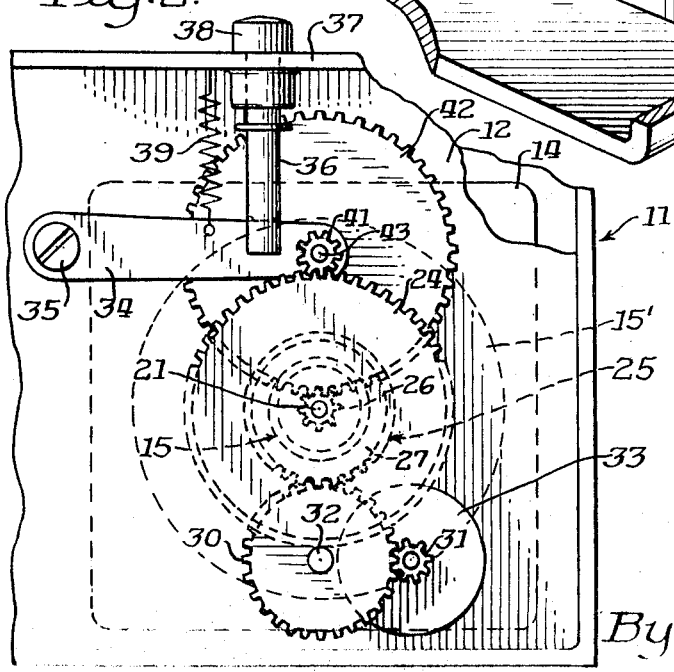

In the drawings:

FIG. 1 is a perspective view of a drive mechanism embodying the invention, with portions broken away to facilitate illustration, and FIG. 2 is a side elevational view of the drive mechanism on a reduced scale.

Referring to the drawings, a housing 11 has a partition 12 defining one wall of a cartridge chamber 13 at one side of the housing. A cartridge 14, positioned in chamber 13, encloses a take-up, shown as hub 15, for receiving film from supply 15' when the camera is operated. The hub has a cylindrical wall 16 that fits within an opening 17 in the wall of the cartridge adjacent the partition. The partition 12 has an opening 18 in registration with the opening 17. A bearing 19 is mounted in the opening 18.

A take-up driver 20 comprises a shaft 21 rotatably mounted in the bearing 19 and a plate 22 fixed to the shaft and fitted within the cylindrical wall 16. The plate 22 has fingers 23 engaging the take-up hub to rotate it as the shaft 21 is rotated. A gear 24 is fixed to the end of shaft 21 remote from the plate 22. A compound gear 25, comprising a pinion gear 26 and a larger gear 27, is rotatably mounted on the shaft 21 between the gear 24 and the bearing 19. A thrust washer 28 is mounted on the shaft 21 between gear 27 and the bearing 19. A spring washer 29 fixed on the shaft 21 between the gears 24 and 27 frictionally engages both of these gears. During normal filming operations, the compound gear 25 is rotated, by means hereinafter described, and the gear 24 is driven by the friction exerted thereagainst by the spring washer 29. This drive mechanism drives the take-up at the same rate as film is withdrawn from the supply so that the film fed from the supply through the camera is rewound on the take-up without any slack. That is, a length of film equal to that taken-up is transported from the supply by the camera shuttle or claw (not shown).

The means for driving the compound gear 25 comprises two continually meshed gears 30 and 31. Gear 30 is rotatably mounted on pin 32, which is fixed to the partition 12 and projects into the mechanism chamber of the camera in parallel relationship to the shaft 21. Gear 30 is in meshing engagement with gear 27, and during normal filming operation drives that gear when gear 31 is driven by a motor 33 which in this preferred embodiment simultaneously drives the film transport claw. The resulting gear ratio causes the take-up hub 15 to wind up the same length of film as is fed by the claw.

A lever 34 is pivotally mounted at one end on a pin 35 projecting from the partition 12 in the same direction as the shaft 21. A control member, shown as rod 36, coupled to lever 34 intermediate its length, projects externally through a wall of the housing 11, shown as top wall 37. The rod is provided with a button 38 which may be pressed downwardly to move the lever pivotally in one direction. A tension spring 39 is secured to the wall 37 and to the lever to retract the lever when the pressure against the button 38 is released. A pair of gears fixed together for co-rotation, comprises a pinion gear 41 and another gear 42, mounted on a stub shaft 43 extending through the end portion of lever 34. In the preferred embodiment, the gear pair is fixed to stub shaft 43, which shaft is rotatably mounted on the lever.

Gears 41 and 42 are so located that when the lever 34 is moved pivotally by downward pressure on the button 38, the gears move into meshing engagement with the gears 24 and 26, respectively. When the gears 41 and 42 are interposed in the gear train that drives the take-up hub during the normal filming operation, they eliminate the effect of the frictional pressure of the spring washer 29 on the gear 24. The pinion gear 26, which is driven through gear 27 by gear 30, drives gear 42, and thereby drives pinion gear 41 which provides a positive gear drive for the gear 24. Thrust washer 28 and the spring washer 29 permit the shaft 21 to rotate independently of the friction between the spring washer 29 and the gear 24. By interposition of gears 41 and 42 in the drive train of the driving mechanism, the gear ratio of the driving mechanism is changed so that the speed of the take-up reel is slowed down. Therefore, when the gears 41 and 42 are interposed in the driving mechanism, the take-up does not wind film as fast as film is fed from the supply and excess film accummulates in the film cartridge during this portion of filming operation. The excess length of film once exposed, can be rewound on the supply for a second exposure of that portion of film. After rewinding of the desired length of film, the take-up transmission is coupled for normal rate drive to take up film at the same rate as film is fed by a not shown shuttle device.

Although I have described a preferred embodiment of the invention in considerable detail, it will be understood that the description thereof is intended to be illustrative, as many of the details may be modified or changed without departing from the spirit or scope of the invention.

What is claimed is:

1. In a camera, a drive mechanism for driving a film take-up at the same rate as film is fed thereto and at a rate different from that rate, the mechanism comprising:

means interengageable with said drive mechanism for slowing the rate of said take-up relative to the rate of feed of the film; and means for moving said first mentioned means into and out of engagement with said drive mechanism.

2. The drive mechanism recited in claim 1, in which said first mentioned means comprises a co-rotatable gear pair.

3. The drive mechanism recited in claim 2, in which said second mentioned means comprises a pivoted lever on which said gear pair is rotatably mounted, and a control member for actuating said lever.

4. A drive mechanism as in claim 1, wherein said drive mechanism comprises a driven gear, a second gear concentric with said driven gear and fixed to a take-up shaft, a friction member interconnecting said concentric gears, and said interengaging means comprises a co-rotatable gear pair, and means for meshing said gear pair respectively with said concentric gears whereby said second gear is driven by said driven gear independently of said friction member.

5. A two-speed take-up drive mechanism comprising a shaft engaging the hub of a take-up for rotating same, a first gear fixed to said shaft, a second gear rotatable relative to said shaft, means for rotating said second gear at a constant speed, a spring washer frictionally engaged with said first and second gears for rotating said first gear at normal speed when said second gear is rotated, a lever pivoted in a plane parallel to the planes of said first and second gears, and a co-rotatable gear pair rotatably mounted on said lever, said lever being operable to move said gear pair into meshing engagement with said first and second gears, whereby said second gear drives said first gear through said compound gear independently of the frictional engagement of said spring washer.

6. In a camera, a housing accepting a film cartridge having a unidirectionally rotatable take-up means, said take-up means having a hub extending through one wall of said cartridge, a take-up drive of said camera engageable with said hub for rotating said take-up means, the driving comprising a shaft, a first gear fixed to said shaft, a second gear rotatably mounted on said shaft, means for driving said second gear at a constant speed, friction means engaging said first and second gears to drive said first gear in response to the rotation of said second gear, a co-rotatable gear pair engageable with said first and second gears for driving said first gear in response to the rotation of said second gear independently of said friction means and means for moving said gear pair into and out of engagement with said first and second gears.

7. The structure recited in claim 6, in which said last mentioned means comprises a pivoted lever on which said gear pair is rotatably mounted, a control means coupled to said lever and having a portion arranged externally of said housing for manual actuation and a spring means secured to said housing and to said lever to disengage said co-rotatably gear pair from said first and second gears when said control member is released.

8. In a camera having motive means for driving a film transport at a predetermined rate and for driving a unidirectionally operable film take-up, the improvement comprising:

a two speed transmission between said motive means and said take-up for driving said take-up at a first rate corresponding to a film transport rate and at a second rate slower than the film transport rate.

* * * * *